US 12,285,982 B2

(12) United States Patent
Yoo et al.

(10) Patent No.: US 12,285,982 B2
(45) Date of Patent: Apr. 29, 2025

(54) SUSPENSION SYSTEM FOR A VEHICLE

(71) Applicants: HYUNDAI MOTOR COMPANY, Seoul (KR); KIA CORPORATION, Seoul (KR); DMC, INC, Seongnam-si (KR)

(72) Inventors: Sang Hoon Yoo, Anyang-si (KR); Byeong Gu Jang, Yeongcheon-si (KR); Mu Geun Choi, Yeongcheon-si (KR)

(73) Assignees: HYUNDAI MOTOR COMPANY, Seoul (KR); KIA CORPORATION, Seoul (KR); DMC, INC, Seongnam-si (KR)

( * ) Notice: Subject to any disclaimer, the term of this patent is extended or adjusted under 35 U.S.C. 154(b) by 0 days.

(21) Appl. No.: 18/198,434

(22) Filed: May 17, 2023

(65) Prior Publication Data

US 2024/0190195 A1 Jun. 13, 2024

(30) Foreign Application Priority Data

Dec. 13, 2022 (KR) .................... 10-2022-0174013

(51) Int. Cl.
*B60G 11/16* (2006.01)

(52) U.S. Cl.
CPC ........ *B60G 11/16* (2013.01); *B60G 2200/142* (2013.01); *B60G 2202/12* (2013.01); *B60G 2204/1244* (2013.01); *B60G 2206/7104* (2013.01); *B60G 2206/73* (2013.01)

(58) Field of Classification Search
CPC ............... B60G 11/16; B60G 2202/12; B60G 2204/1244; B60G 2206/7104; B60G 2206/73
See application file for complete search history.

(56) References Cited

U.S. PATENT DOCUMENTS

| 4,350,354 A | * | 9/1982 | Dotti | B60G 17/0277 |
| | | | | 280/6.159 |
| 5,342,139 A | * | 8/1994 | Hoffman | F16B 5/065 |
| | | | | 267/64.23 |
| 6,076,841 A | * | 6/2000 | Satou | B60G 11/16 |
| | | | | 280/124.179 |
| 2006/0175776 A1 | * | 8/2006 | Christophel | B60G 17/021 |
| | | | | 280/124.179 |
| 2007/0013161 A1 | * | 1/2007 | Rhein | B60G 11/14 |
| | | | | 280/124.162 |
| 2007/0210539 A1 | * | 9/2007 | Hakui | B60G 15/063 |
| | | | | 280/124.147 |
| 2008/0277892 A1 | * | 11/2008 | Weshendorff | B62D 25/088 |
| | | | | 280/124.179 |
| 2009/0108546 A1 | * | 4/2009 | Ohletz | B60G 15/063 |
| | | | | 280/124.179 |
| 2011/0254241 A1 | * | 10/2011 | Piontek | F16F 7/00 |
| | | | | 280/124.1 |
| 2018/0126816 A1 | * | 5/2018 | Kondo | B60G 11/16 |
| 2020/0171905 A1 | * | 6/2020 | Igarashi | B60G 11/16 |

FOREIGN PATENT DOCUMENTS

KR 20080052760 A 6/2008

* cited by examiner

*Primary Examiner* — Frank B Vanaman
(74) *Attorney, Agent, or Firm* — Lempia Summerfield Katz LLC

(57) ABSTRACT

A suspension system for a vehicle is capable of preventing a spring from completely escaping from a spring pad when rebound additionally occurs in a full-rebound state during driving of the vehicle and thus the spring is extended beyond the extendable range thereof (or the free height thereof).

17 Claims, 8 Drawing Sheets

SUSPENSION SYSTEM FOR A VEHICLE

CROSS-REFERENCE TO RELATED APPLICATION

This application claims the benefit of and priority to Korean Patent Application No. 10-2022-0174013, filed on Dec. 13, 2022, in the Korean Intellectual Property Office, the disclosure of which is incorporated herein by reference.

BACKGROUND

1. Field

The present disclosure relates to a suspension system for a vehicle, and more particularly to a suspension system having a configuration capable of preventing the escape of a spring connecting a suspension arm to a vehicle body member when additional rebound occurs in a full-rebound state during driving of the vehicle.

2. Description of the Related Art

In a recent trend, tuning vehicles "hard" has increased due to European vehicles having improved handling performance, and vehicle weight has been reduced to meet eco-friendly requirements.

In order to tune a vehicle hard, a wheel rate should be high, i.e., high hardness supporting a tire when vertical load is applied to the tire. This can be achieved by increasing the stiffness of a spring connecting a suspension arm to a vehicle body member.

When the weight of the vehicle is reduced, the force compressing the spring decreases, and thus the amount of compression of the spring is reduced.

In the state in which the stiffness of the spring is increased in order to satisfy the hard property of the vehicle, when the weight of the vehicle is reduced in order to satisfy the property of the eco-friendly vehicle, the amount of compression of the spring due to vertical load applied to the tire is further reduced. For this reason, when rebound additionally occurs in a full-rebound state during driving of the vehicle (e.g., when the spring is extended beyond the extendable range thereof, when the spring is extended beyond the free height thereof, or when the tire passes through a deep puddle), the spring, which connects a suspension arm to a vehicle body member, may escape from the assembled position thereof, leading to an accident such as vehicle rollover.

In order to prevent the escape of the spring, it is desired to reduce the wheel stroke of the vehicle. However, the wheel stroke is a main factor affecting the performance and marketability of the vehicle, and thus it is not easy to change the wheel stroke.

The information disclosed in this Background section of the present disclosure is provided only to enhance understanding of the general background of the present disclosure, and should not be taken as an acknowledgement or any form of suggestion that this information forms the related art already known to a person skilled in the art.

SUMMARY

The present disclosure has been made in view of the above problems, and it is an object of the present disclosure to provide a suspension system for a vehicle, which has a configuration capable of preventing escape of a spring connecting a suspension arm to a vehicle body member when additional rebound occurs in a full-rebound state during driving of the vehicle, i.e. when the spring is extended beyond the extendable range thereof (or extended beyond its free height), thereby improving the stability of the vehicle.

In accordance with the present disclosure, the above and other objects can be accomplished by the provision of a suspension system for a vehicle. In one embodiment of the present disclosure, the suspension system includes a spring pad coupled to a spring connecting a suspension arm to a vehicle body member to support the spring. The spring pad includes: a guide that is coupled to the vehicle body member, and an elastic pad that is coupled to the guide. A portion of the guide may penetrate the elastic pad. The elastic pad may allow an end portion of the spring to be coupled thereto and move along the guide while varying the length thereof in the event of bump and rebound.

The guide may include a cup portion having a concave recess formed therein and a circular flange portion extending horizontally from the upper end of the cup portion. The vehicle body member may be formed in a shape corresponding to the cup portion and the flange portion to be in contact with the inner surface of the cup portion and the upper surface of the flange portion.

The guide may further include: a cover portion extending downwards from the edge of the flange portion, and a receiving portion formed between the cup portion. The cover portion is open downwards. The upper end of the elastic pad may be inserted into the receiving portion to be coupled to the guide.

The guide may further include a cover portion extending downwards from the edge of the flange portion and a coupling hole formed in a connection portion between the flange portion and the cover portion. The upper end of the elastic pad may be inserted into a space between the cup portion and the cover portion, and may be fitted into the coupling hole to couple the elastic pad to the guide.

The guide may further include a guide portion extending downwards from the cup portion, and the elastic pad may be mounted such that the guide portion penetrates the elastic pad, and may move along the guide portion in the event of bump and rebound.

The cup portion may have a flat outer lower surface, which is a seating surface formed to allow the elastic pad to be seated thereon in a surface contact manner. The cover portion may protrude further downwards than the seating surface so that, when the elastic pad is seated on the seating surface in a surface contact manner, the elastic pad is pushed and compressed by the lower end of the cover portion to thereby ensure sealing between the cover portion and the elastic pad.

The cup portion may have a plurality of air holes formed to penetrate the upper and lower surfaces of the cup portion. When the elastic pad is compressed, air present between the guide and the elastic pad may be discharged toward the vehicle body member through the plurality of air holes.

The guide may further include a vehicle body fixing protrusion protruding upwards from the bottom of the cup portion, and the vehicle body fixing protrusion may penetrate the vehicle body member to be coupled to the vehicle body member.

The vehicle body fixing protrusion may be divided into a plurality of branch protrusions. The plurality of branch protrusions may close up when entering the vehicle body member, and may be restored to the original shape thereof after penetrating the vehicle body member to increase coupling force between the spring pad and the vehicle body member.

The vehicle body fixing protrusion may have an end portion formed as a slanted surface to improve assemblability when penetrating the vehicle body member.

The guide may be formed of a plastic material to secure rigidity.

The elastic pad may include a pad portion, which has a spring assembly groove formed therein to allow an end portion of the spring to be coupled thereto and moves upwards and downwards along the guide in the event of bump and rebound. The elastic pad may further include an elastic portion that extends upwards from the pad portion to be coupled at an upper end thereof to the guide and is configured to be variable in length when the pad portion moves.

The pad portion may be formed of a rubber material to absorb shock and prevent occurrence of noise.

The elastic pad may further include an inner steel member, which is formed of a steel material and is coupled to the inside of the pad portion to maintain the shape of the pad portion.

The elastic portion may be formed of any one of a polyurethane material or a highly compressive polymer material.

The elastic portion may be formed with either a bellows-like or cylindrical external shape.

The elastic portion may be compressed by the elastic force of the spring coupled to the pad portion in an empty vehicle state or in the event of bump. In a normal full-rebound state in which the spring is not extended beyond its free height or when additional rebound occurs in the full-rebound state, the pad portion may move downwards along the guide, the elastic portion may be elastically deformed such that the length thereof increases, and the end portion of the spring fitted into the spring assembly groove in the pad portion may be maintained in a state of being coupled to the spring assembly groove so that the spring is prevented from escaping from the spring pad.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION

Figure 1:
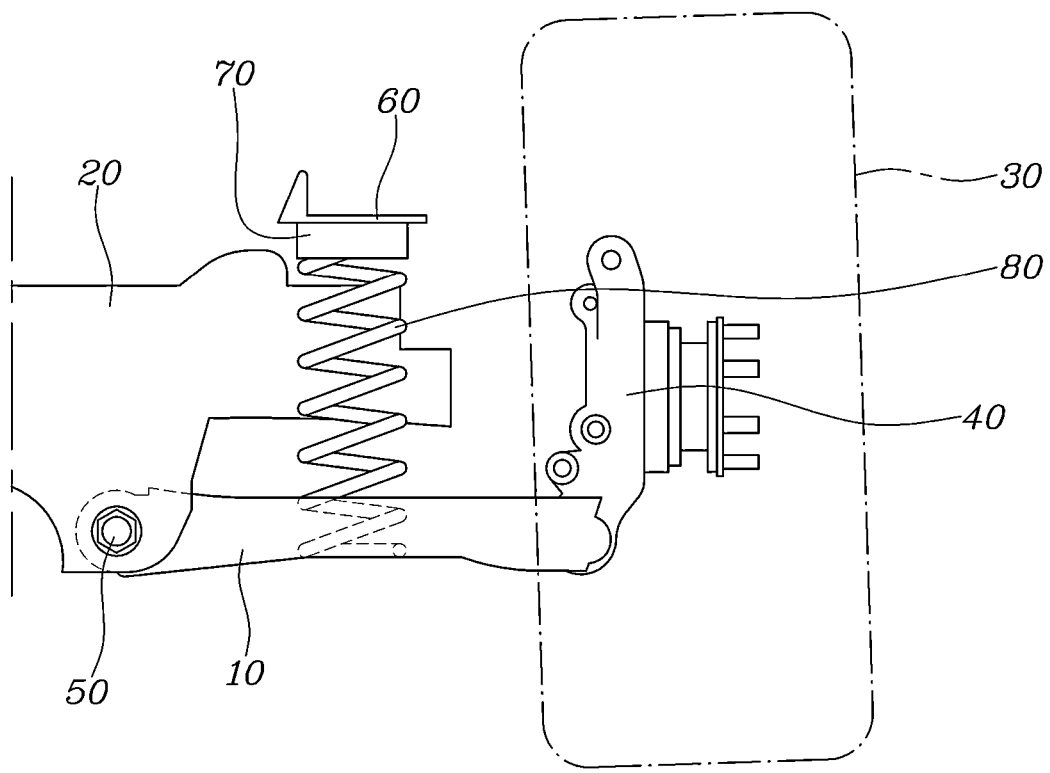
FIG. 1 is a view showing a suspension system for a vehicle according to the present disclosure in which a spring pad is coupled to a vehicle body member in an empty vehicle state.
Figure 2:
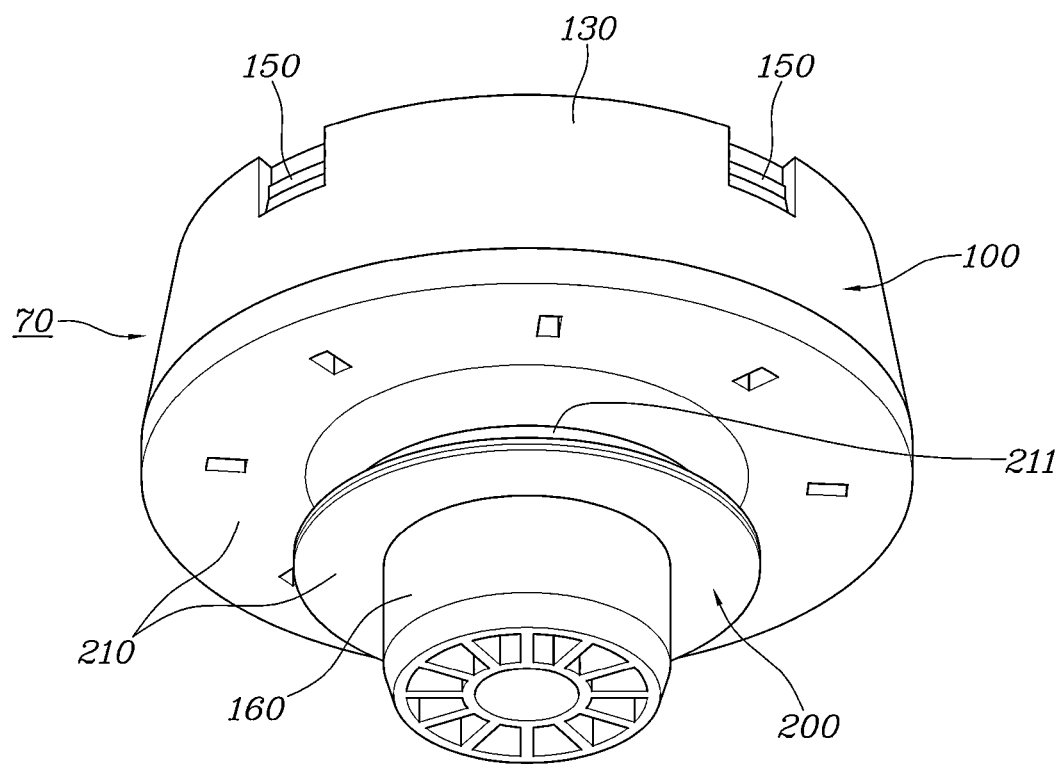
FIG. 2 is a perspective view of the spring pad shown in FIG. 1.
Figure 3:
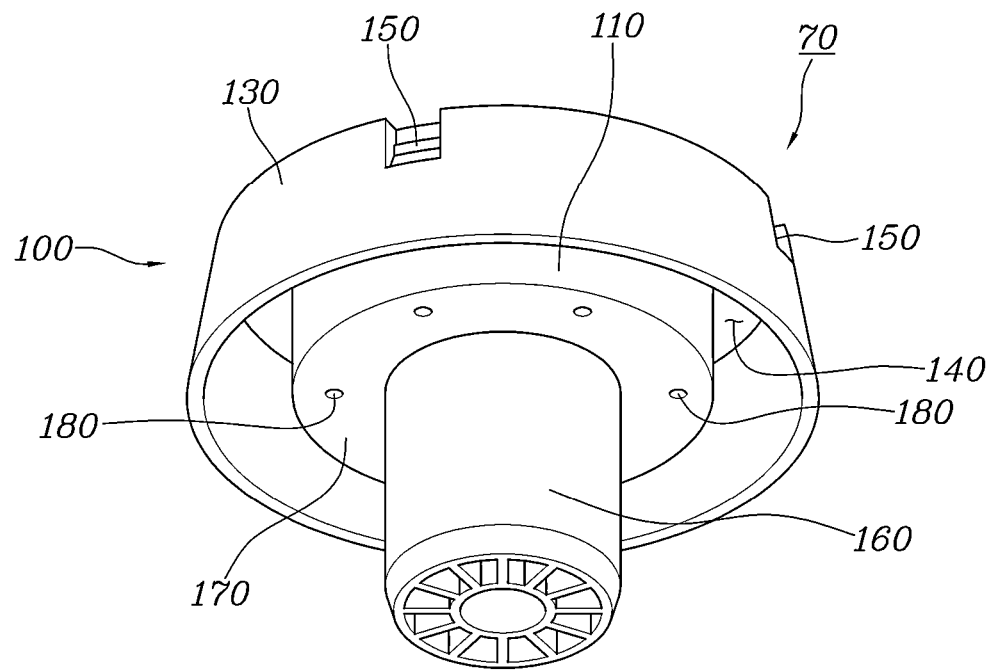
FIG. 3 is an exploded perspective view of a guide and an elastic pad according to one embodiment of the present disclosure.
Figure 3:
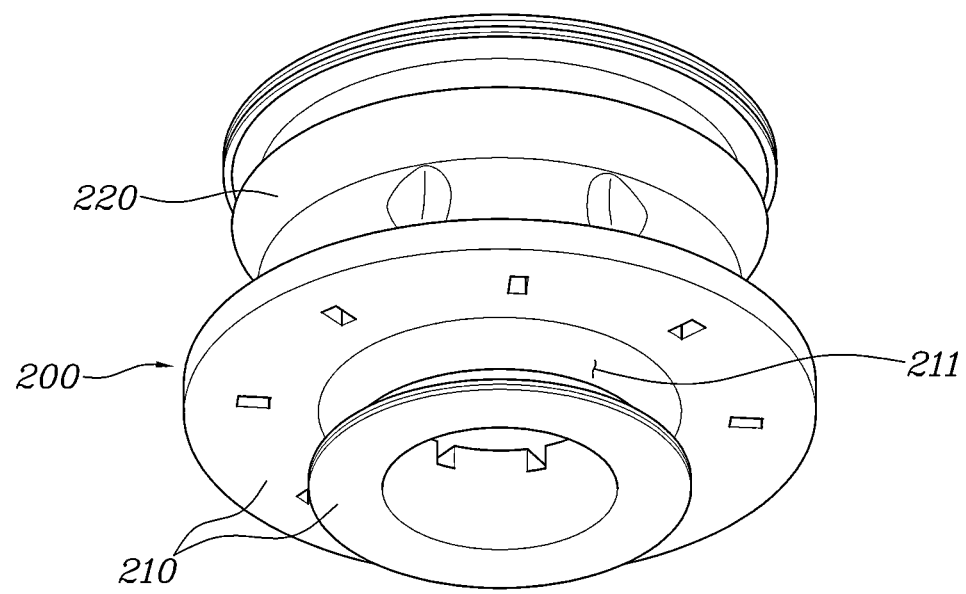

Hereinafter, the embodiments disclosed in the present specification are described in detail with reference to the accompanying drawings, and the same or similar elements are denoted by the same reference numerals even though they are depicted in different drawings, and redundant descriptions thereof have been omitted.

In the following description, with respect to constituent elements used in the following description, the suffixes "module" and "unit" are used only in consideration of facilitation of description, and do not have mutually distinguished meanings or functions.

In addition, in the following description of the embodiments disclosed in the present specification, a detailed description of known functions and configurations incorporated herein has been omitted when it may make the subject matter of the embodiments disclosed in the present specification difficult to comprehend.

In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

Although the terms "first", "second", and the like, may be used herein to describe various components, these components should not be limited by these terms. These terms are only used to distinguish one component from another component.

When a component is referred to as being "connected to" or "coupled to" another component in the present disclosure, it may be directly connected to or coupled to another component, or intervening components may be present.

On the other hand, when a component is referred to as being "directly connected to" or "directly coupled to" another component, there are no intervening components present.

As used herein, the singular form is intended to include the plural forms as well, unless the context clearly indicates otherwise.

It should be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

In addition, the terms "unit" and "control unit" forming part of the names of the motor control unit (MCU) and the hybrid control unit (HCU) are merely terms that are widely used in the naming of a controller for controlling a specific function of a vehicle, and should not be construed as meaning a generic function unit.

In order to control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto. When a component, device, element, or the like of the present disclosure is described as having a purpose or performing an operation, function, or the like, the component, device, or element should be considered herein as being "configured to" meet that purpose or to perform that operation or function.

Hereinafter, a suspension system for a vehicle according to an embodiment of the present disclosure is described with reference to the accompanying drawings.

FIGS. 1 to 8 show a multi-link-type rear-wheel suspension system for explaining the present disclosure.

As shown in the drawings, the suspension system for a vehicle according to one embodiment of the present disclosure is configured such that one end of a suspension arm 10 is connected to a vehicle body frame 20, and the other end of the suspension arm 10 is connected to a knuckle 40 of a tire 30.

In one embodiment, the suspension arm 10 is a rear-wheel lower arm, and the vehicle body frame 20 is a rear-wheel sub-frame or a rear-wheel cross member.

A suspension arm bushing is coupled to one end of the suspension arm 10, and a bolt 50 penetrates the suspension arm bushing and the vehicle body frame 20 and is fastened to a nut, whereby one end of the suspension arm 10 is coupled to the vehicle body frame 20.

The other end of the suspension arm 10 is coupled to the knuckle 40.

In one embodiment according to the present disclosure, the suspension system includes: a spring pad 70 which is fixedly coupled to a vehicle body member 60 positioned above the suspension arm 10, and a spring 80 which has a lower end and an upper end. The lower end of the spring 80 is supported by the suspension arm 10 and the upper end of the spring 80 is coupled to and supported by the spring pad 70 fixed to the vehicle body member 60.

The vehicle body member 60 is a side member, and the spring 80 is a coil spring that connects the suspension arm 10 to the vehicle body member 60 via the spring pad 70.

The spring pad 70 according to one embodiment of the present disclosure includes: a guide 100 which is coupled to the vehicle body member 60, and an elastic pad 200 which is coupled to the guide 100. In one embodiment, the guide 100 penetrates the elastic pad 200 and an end portion of the spring 80 is coupled to the elastic pad 200 so that the elastic pad 200 moves along the guide 100 while varying the length thereof in the event of bump and rebound.

When the vehicle is in an empty vehicle state, when the suspension system operates between a normal full-bump state and a normal full-rebound state in which the spring is not extended beyond its free height, or when rebound additionally occurs in the full-rebound state, the upper end of the spring 80 is always maintained in a state of being coupled to the elastic pad 200, whereby escape of the spring 80 from the spring pad 70 is prevented.

In one embodiment, the guide 100 includes a cup portion 110 that has a concave recess formed in the upper surface thereof so as to extend downwards. The guide 100 further includes a circular flange portion 120 which extends horizontally from the upper end of the cup portion 110.

The vehicle body member 60 is formed in a shape corresponding to the cup portion 110 and the flange portion 120 to be in contact with the inner surface of the cup portion 110 and the upper surface of the flange portion 120.

The guide 100 further includes: a cover portion 130, which extends downwards from the edge of the flange portion 120, and a receiving portion 140, which is formed between the cup portion 110 and the cover portion 130 and is open downwards. The upper end of the elastic pad 200 is inserted into the receiving portion 140, and thus is coupled to the guide 100.

In the guide 100, a plurality of coupling holes 150 is formed in the edge portion at which the flange portion 120 and the cover portion 130 are connected to each other. The coupling holes 150 are disposed so as to be spaced apart from each other in the circumferential direction. The guide 100 and the elastic pad 200 are coupled to each other in such a manner that the upper end of the elastic pad 200 is inserted into the receiving portion 140 and then fitted into the coupling holes 150. The receiving portion 140 is a space defined between the cup portion 110 and the cover portion 130.

The guide 100 further includes a guide portion 160, which extends downwards from the cup portion 110.

The guide portion 160 penetrates the elastic pad 200, and thus the elastic pad 200 moves upwards and downwards along the guide portion 160 in the event of bump and rebound.

The cup portion 110 of the guide 100 has a flat outer lower surface. The flat outer lower surface of the cup portion 110 is a seating surface 170 on which the elastic pad 200 is seated in a surface contact manner in an empty vehicle state or in a bump state.

Due to the surface contact between the seating surface 170 and the elastic pad 200, the sealing performance of the elastic pad 200 may be improved. Particularly, uneven wear of the elastic pad 200 may be prevented, and thus the durability thereof may be improved.

The cover portion 130 of the guide 100 protrudes further downwards than the seating surface 170. Therefore, when the elastic pad 200 is seated on the seating surface 170 in a surface contact manner, the elastic pad 200 is pushed by the lower end of the cover portion 130, and thus is maintained in a compressed state. Accordingly, sealing between the cover portion 130 and the elastic pad 200 may be ensured.

The cup portion 110 has a plurality of air holes 180 formed to penetrate or pass through both the upper and lower surfaces of the cup portion 110. The air holes 180 are positioned in such a way that they are evenly distributed and spaced apart from each other in the circumferential direction.

When the elastic pad 200 is compressed, air present between the guide 100 and the elastic pad 200 is discharged toward the vehicle body member 60 through the air holes 180. Accordingly, in the event of bump and rebound, the elastic pad 200 is smoothly moved upwards and downwards, and particularly, operational noise of the spring pad 70 is minimized.

In order to secure sufficient coupling force between the vehicle body member 60 and the spring pad 70, the guide 100 of the spring pad 70 includes a vehicle body fixing protrusion 190 protruding upwards. The vehicle body fixing protrusion 190 penetrates the vehicle body member 60, and thereby is coupled to the vehicle body member 60.

In other words, the vehicle body fixing protrusion 190 is formed on the bottom surface of the cup portion 110 of the spring pad 70 so as to protrude upwards, and a hole 61 is formed in the bottom of the vehicle body member 60 inserted into the cup portion 110. The spring pad 70 is coupled to the vehicle body member 60 in such a manner that the vehicle body fixing protrusion 190 penetrates the hole 61 in the vehicle body member 60.

The vehicle body fixing protrusion 190 may be divided into a plurality of branch protrusions 191. The branch protrusions 191 close up when entering the vehicle body member 60, and are restored to the original shape thereof after penetrating the vehicle body member 60. In other words, when entering the vehicle body member 60, the branch protrusions 191 become compressed or folded, and then return to their original shape after passing through the vehicle body member 60, thereby increasing coupling force between the spring pad 70 and the vehicle body member 60.

According to the embodiment of the present disclosure, all of the parts of the spring pad 70, including the vehicle body fixing protrusion 190, may be formed of a plastic material to secure sufficient rigidity. The vehicle body fixing protrusion 190 formed of a plastic material is fixedly coupled to the vehicle body member 60 by adjusting a clearance between the vehicle body fixing protrusion 190 and the hole 61 formed through the vehicle body member 60.

The distal end portion of the vehicle body fixing protrusion 190 formed of a plastic material is formed as a slanted surface 192 so that the vehicle body fixing protrusion 190 smoothly penetrates the hole 61 of the vehicle body member 60.

Due to the slanted surface 192, the vehicle body fixing protrusion 190 has a shape that gradually narrows to a point at the top.

The elastic pad 200 according to the present disclosure includes a pad portion 210 and an elastic portion 220.

The pad portion 210 has a spring assembly groove 211 formed therein to allow an end portion (the upper end) of the spring 80 to be coupled thereto. The spring assembly groove 211 has an arc-shaped cross-section having a curvature corresponding to that of the cross-section of the spring 80.

The pad portion 210, through which the guide portion 160 passes, moves upwards and downwards along the guide 100 in the event of bump and rebound.

In one embodiment, the pad portion 210 is formed of a rubber material or an elastic material to prevent the occurrence of shock, noise, and chipping due to contact between steel materials. However, the embodiments are not limited thereto.

An inner steel member 300 made of a steel material is coupled to the inside of the pad portion 210 made of rubber to maintain the shape of the pad portion 210.

The elastic portion 220 extends upwards from the upper surface of the pad portion 210, and the upper end of the elastic portion 220 is inserted into the coupling holes 150, and thereby is coupled to the guide 100. The length of the elastic portion 220 varies when the pad portion 210 moves upwards and downwards.

The spring 80 is compressed and extended in the event of bump and rebound, and the pad portion 210 coupled to the spring 80 moves upwards and downwards along the guide portion 160 with compression and extension of the spring 80. Even when the pad portion 210 moves upwards and downwards, the upper end of the elastic portion 220 needs to always be maintained in a state of being inserted into the coupling holes 150 in order to connect the guide 100 and the pad portion 210 to each other. To this end, the elastic portion 220 needs to be variable in length in the upward-downward direction in the event of bump and rebound.

The elastic portion 220 may be formed of a polyurethane material, a highly compressive polymer material, or combination thereof, having elasticity so as to be variable in length, but the embodiments are not limited thereto.

The elastic portion 220 may be formed to have either a length-variable bellows-like external shape or a general cylindrical external shape. The spring constant of the elastic portion 220 and the length thereof that can vary in the upward-downward direction may be variously set by changing the cross-sectional area or the shape thereof.

Figure 4:
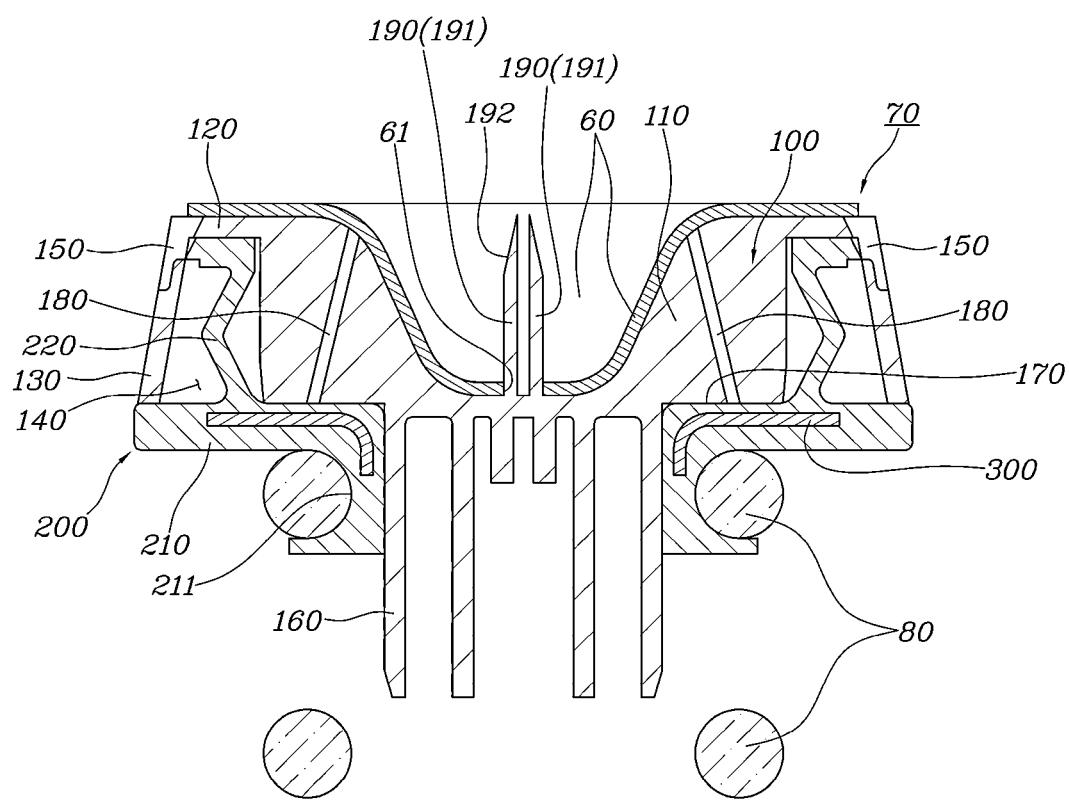
FIG. 4 is a cross-sectional view of FIG. 2.

FIG. 1 shows an empty vehicle state, and FIG. 4 shows the state of the spring pad 70 in the empty vehicle state.

In the empty vehicle state, the spring 80 is in a normal state in which the spring is not extended beyond the free height thereof. Therefore, the elastic portion 220 of the elastic pad 200 constituting the spring pad 70 is maintained in a state of being compressed by the elastic force of the spring 80 coupled to the pad portion 210. In this case, the upper end of the spring 80, which is coupled to the pad portion 210, is maintained in a state of being supported by the pad portion 210.

When bump occurs in the empty vehicle state shown in FIG. 1, the suspension arm 10 rotates about the bolt 50 in the counterclockwise direction in the illustrated state, the tire 30 moves upwards, and the spring 80 is further compressed than in the state shown in FIG. 1.

Therefore, in a normal full-bump state in which the spring is not extended beyond the free height thereof, the upper end of the spring 80, which is coupled to the pad portion 210 of the elastic pad 200, is maintained in a state of being supported by the pad portion 210.

Figure 5:
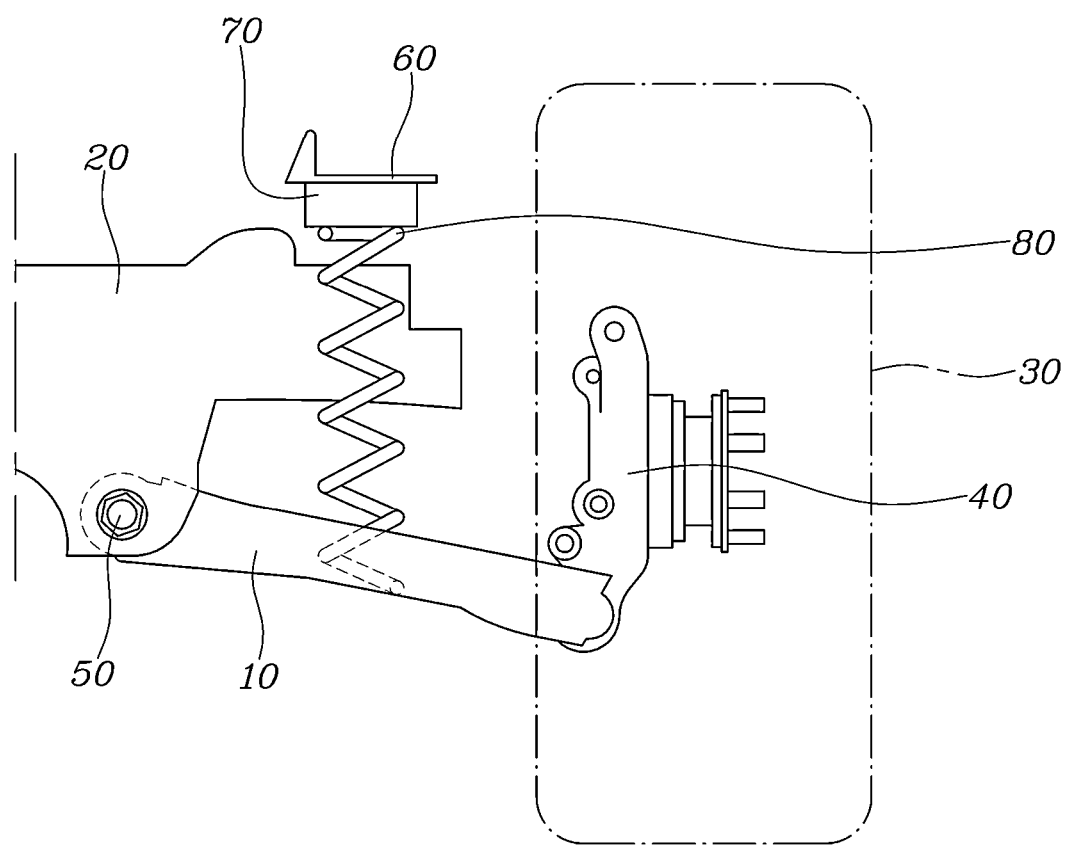
FIG. 5 is a view showing a full-rebound state of the suspension system shown in FIG. 1.
Figure 6:
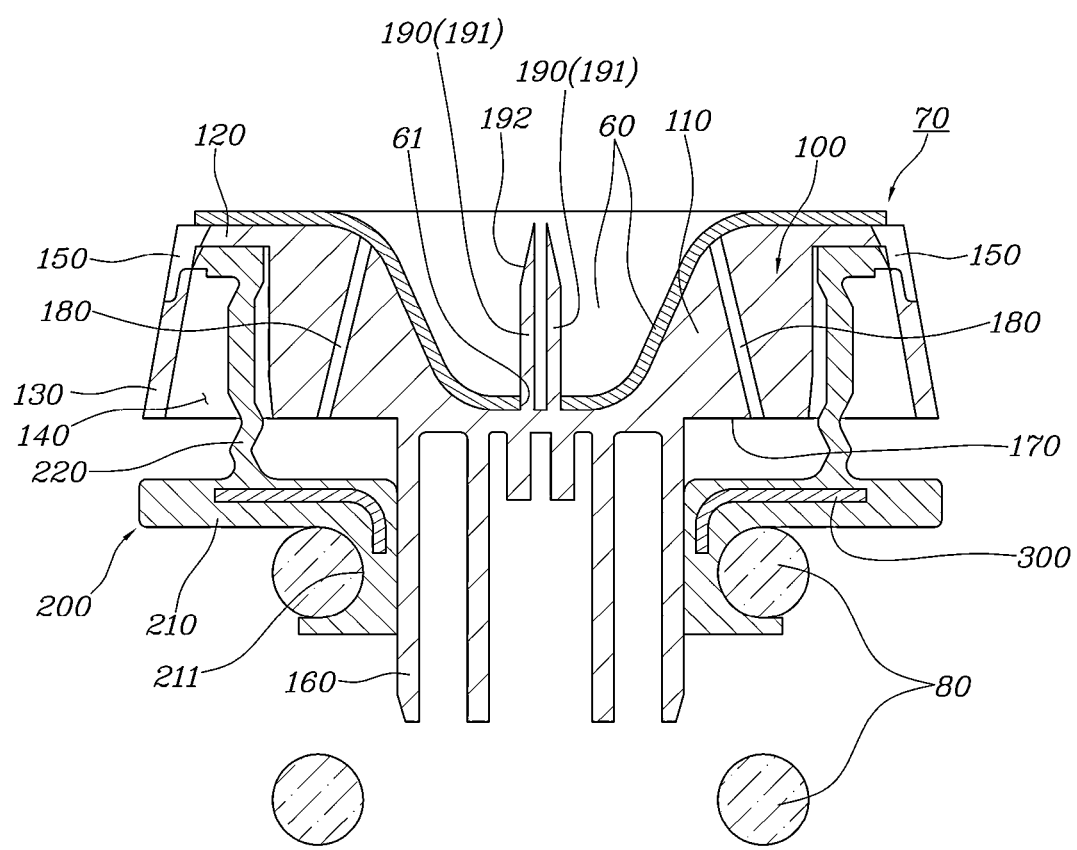
FIG. 6 is a view for explaining the spring pad and the spring shown in FIG. 5.

FIG. 5 shows a full-rebound state, and FIG. 6 shows the state of the spring pad 70 in the full-rebound state.

When full-rebound occurs in the empty vehicle state shown in FIG. 1, the suspension arm 10 rotates about the bolt 50 in the clockwise direction in the state shown in FIG. 1, and thus is positioned as shown in FIG. 5. In addition, the tire 30 moves downwards, and the spring 80 is further extended than in the state shown in FIG. 1.

When the spring 80 is extended, the pad portion 210 coupled to the spring 80 moves downwards along the guide portion 160, and the length of the elastic portion 220, which connects the pad portion 210 to the guide 100, becomes longer than the length in the empty vehicle state shown in FIG. 4 due to the movement of the pad portion 210.

Because the full-rebound state is a normal state in which the spring 80 is not extended beyond the free height thereof, the upper end of the spring 80, which is coupled to the pad portion 210, is maintained in a state of being supported by the pad portion 210 in the normal full-rebound state.

Figure 7:
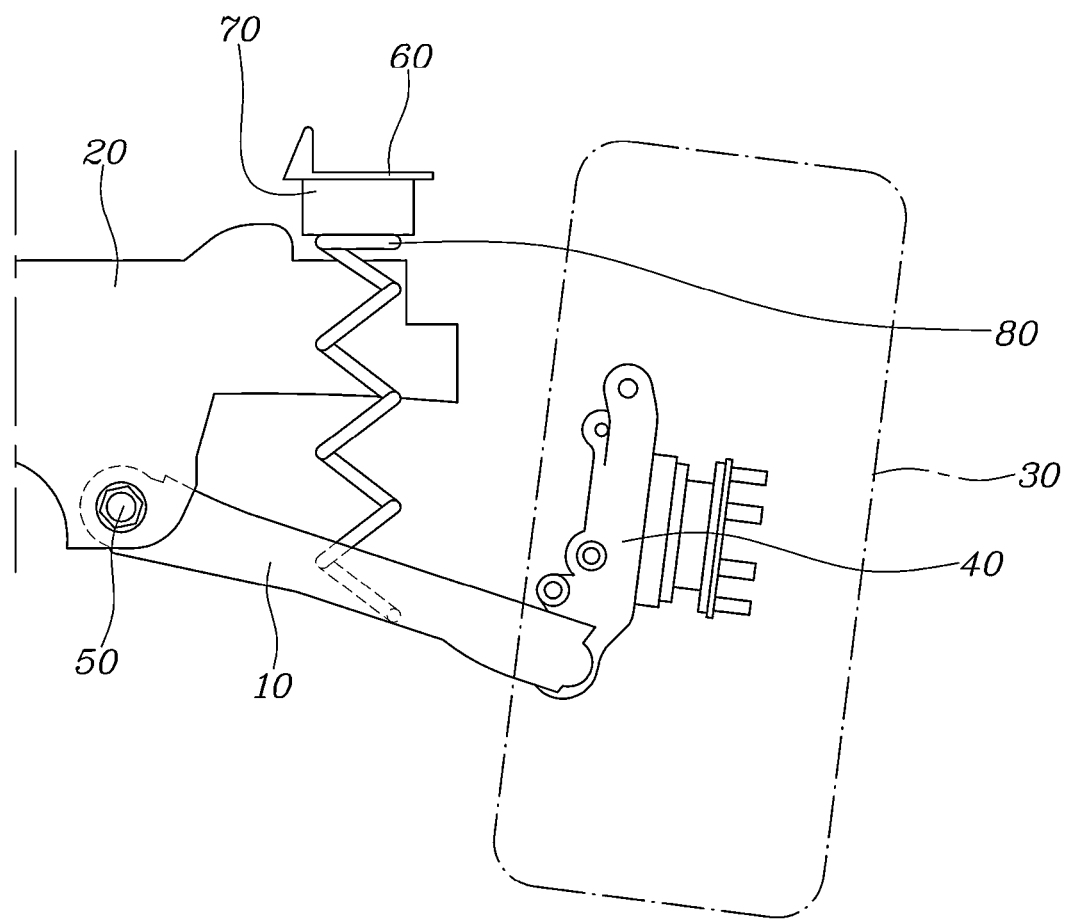
FIG. 7 is a view showing a state in which additional rebound occurs in the full-rebound state shown in FIG. 5.
Figure 8:
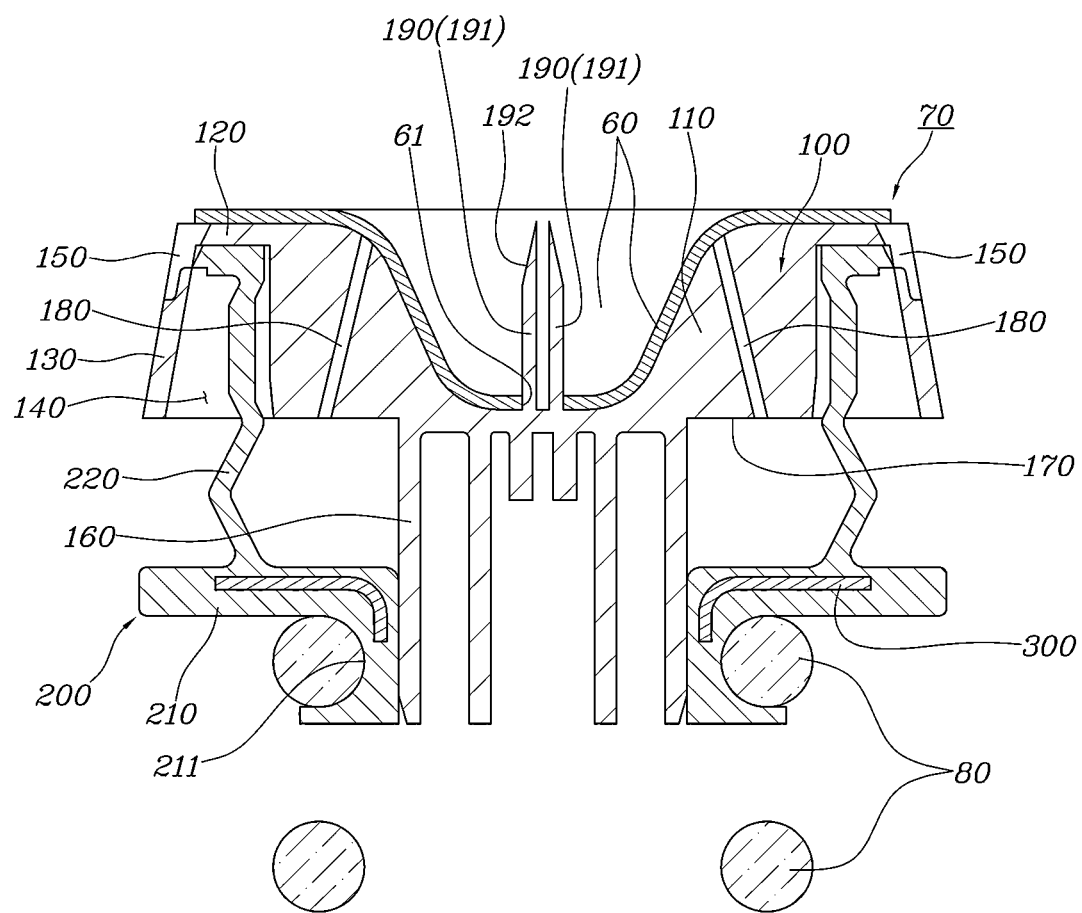
FIG. 8 is a view for explaining the spring pad and the spring shown in FIG. 7.

FIG. 7 shows a state in which rebound additionally occurs in the full-rebound state, and FIG. 8 shows the state of the spring pad 70 when rebound additionally occurs.

When additional rebound occurs in the full-rebound state shown in FIG. 5, the suspension arm 10 further rotates about the bolt 50 in the clockwise direction in the state shown in FIG. 5, and thus further moves downwards, as shown in FIG. 7. In addition, the tire 30 further moves downwards, and the spring 80 is further extended than in the state shown in FIG. 5.

When the spring 80 is further extended than in the state shown in FIG. 5 and thus is positioned as shown in FIG. 7, in other words, when the spring 80 is extended beyond the free height thereof, a conventional suspension system has a problem in that the spring 80 escapes from the assembled position thereof.

In contrast, according to the embodiment of the present disclosure, even when additional rebound occurs in the full-rebound state as shown in FIGS. 7 and 8, the pad portion 210 continues to move downwards along the guide portion 160, and the length of the elastic portion 220, which connects the pad portion 210 to the guide 100, becomes longer than the length in the full-rebound state shown in FIG. 6 due to the downward movement of the pad portion 210. Accordingly, the upper end of the spring 80, which is coupled to the pad portion 210, is always maintained in a state of being supported by the pad portion 210. As a result, it is possible to prevent escape of the spring 80.

As is apparent from the above description, according to the embodiment of the present disclosure, even when rebound additionally occurs in the full-rebound state and thus the spring 80 is extended beyond the extendable range thereof (or the free height thereof), it is possible to prevent the spring 80 from completely escaping from the spring pad 70. Accordingly, an accident such as vehicle rollover may be prevented, and the stability of the vehicle may be improved, resulting in improved marketability of the vehicle.

In addition, according to the embodiment of the present disclosure, it is possible to prevent escape of the rear-wheel spring in the event of full-rebound of a vehicle having a high wheel rate, such as a vehicle tuned to have excellent handling performance or a high-performance vehicle. Accordingly, it is possible to secure an additional rebound stroke, and in particular, it is possible to provide excellent ride comfort by improving impact shock even in the case of a high-performance vehicle.

Although specific embodiments of the present disclosure have been disclosed for illustrative purposes, those having ordinary skill in the art should appreciate that various modifications, additions and substitutions are possible, without departing from the scope and spirit of the present disclosure.

What is claimed is:

1. A suspension system for a vehicle, the suspension system comprising:
   a spring pad coupled to a spring connecting a suspension arm to a vehicle body member and configured to support the spring, wherein the spring pad comprises:
   a guide coupled to the vehicle body member and including a cup portion having a concave recess formed therein; and
   an elastic pad coupled to the guide and configured to allow an end portion of the spring to be coupled thereto,
   wherein the elastic pad is configured to move along the guide while varying a length thereof in an event of bump and rebound,
   wherein the vehicle body member is formed in a shape corresponding to the cup portion and directly coupled to the cup portion of the guide,
   wherein the guide comprises a circular flange portion extending horizontally from an upper end of the cup portion, and the circular flange portion is in contact with an inner surface of the cup portion and an upper surface of the circular flange portion,
   wherein the guide further comprises:
   a cover portion extending downwards from an edge of the circular flange portion; and
   a receiving portion formed between the cup portion and the cover portion to be open downwards, and
   wherein an upper end of the elastic pad is inserted into the receiving portion to be coupled to the guide.

2. The suspension system according to claim 1, wherein the guide further comprises:
   a coupling hole formed in a connection portion between the circular flange portion and the cover portion, and
   wherein an upper end of the elastic pad is inserted into a space between the cup portion and the cover portion and is fitted into the coupling hole to couple the elastic pad to the guide.

3. The suspension system according to claim 1, wherein the guide further comprises:
   a guide portion extending downwards from the cup portion, and
   wherein the guide portion penetrates the elastic pad, and the elastic pad moves along the guide portion in an event of bump and rebound.

4. The suspension system according to claim 1, wherein the cup portion has a flat outer lower surface, the flat outer lower surface being a seating surface formed to allow the elastic pad to be seated thereon in a surface contact manner.

5. The suspension system according to claim 1, wherein the cup portion has a plurality of air holes formed to penetrate upper and lower surfaces of the cup portion, and
   wherein, when the elastic pad is compressed, air present between the guide and the elastic pad is discharged toward the vehicle body member through the plurality of air holes.

6. The suspension system according to claim 1, wherein the guide further comprises a vehicle body fixing protrusion protruding upwards from a bottom of the cup portion, and
   wherein the vehicle body fixing protrusion penetrates the vehicle body member to be coupled to the vehicle body member.

7. The suspension system according to claim 6, wherein the vehicle body fixing protrusion is divided into a plurality of branch protrusions, and
   wherein the plurality of branch protrusions closes up when entering the vehicle body member, and is restored to an original shape thereof after penetrating the vehicle body member to increase coupling force between the spring pad and the vehicle body member.

8. The suspension system according to claim 6, wherein the vehicle body fixing protrusion has an end portion formed as a slanted surface to improve assemblability when penetrating the vehicle body member.

9. The suspension system according to claim 1, wherein the guide is formed of a plastic material to secure rigidity.

10. The suspension system according to claim 1, wherein the elastic pad comprises:
    a pad portion having a spring assembly groove formed therein to allow an end portion of the spring to be coupled thereto, the pad portion being configured to move upwards and downwards along the guide in an event of bump and rebound; and
    an elastic portion extending upwards from the pad portion to be coupled at an upper end thereof to the guide, the elastic portion being configured to be variable in length when the pad portion moves.

11. The suspension system according to claim 10, wherein the pad portion is formed of a rubber material to absorb shock and prevent occurrence of noise.

12. The suspension system according to claim 11, wherein the elastic pad further comprises an inner steel member coupled to an inside of the pad portion to maintain a shape of the pad portion, the inner steel member being formed of a steel material.

13. The suspension system according to claim 10, wherein the elastic portion is formed of any one of a polyurethane material or a highly compressive polymer material.

14. The suspension system according to claim 10, wherein the elastic portion is formed with either a bellow or cylindrical external shape.

15. The suspension system according to claim 10, wherein the elastic portion is compressed by an elastic force of the spring coupled to the pad portion in an empty vehicle state or in an event of bump, and
    wherein, in a full-rebound state in which the spring is not extended beyond a free height thereof or when rebound additionally occurs in the full-rebound state, the pad portion moves downwards along the guide, the elastic portion is elastically deformed such that a length thereof increases, and the end portion of the spring fitted into the spring assembly groove in the pad portion is maintained in a state of being coupled to the spring assembly groove so that the spring is prevented from escaping from the spring pad.

16. A suspension system for a vehicle, the suspension system comprising:
a spring pad coupled to a spring connecting a suspension arm to a vehicle body member and configured to support the spring, wherein the spring pad comprises:
a guide coupled to the vehicle body member and including a cup portion having a concave recess formed therein; and
an elastic pad coupled to the guide and configured to allow an end portion of the spring to be coupled thereto,
wherein the elastic pad is configured to move along the guide while varying a length thereof in an event of bump and rebound,
wherein the vehicle body member is formed in a shape corresponding to the cup portion and directly coupled to the cup portion of the guide,
wherein the guide comprises a circular flange portion extending horizontally from an upper end of the cup portion, and the circular flange portion is in contact with an inner surface of the cup portion and an upper surface of the circular flange portion,
wherein the guide further comprises:
a cover portion extending downwards from an edge of the circular flange portion; and
a coupling hole formed in a connection portion between the circular flange portion and the cover portion, and
wherein an upper end of the elastic pad is inserted into a space between the cup portion and the cover portion and is fitted into the coupling hole to couple the elastic pad to the guide.

17. A suspension system for a vehicle, the suspension system comprising:
a spring pad coupled to a spring connecting a suspension arm to a vehicle body member and configured to support the spring, wherein the spring pad comprises:
a guide coupled to the vehicle body member and including a cup portion having a concave recess formed therein; and
an elastic pad coupled to the guide and configured to allow an end portion of the spring to be coupled thereto,
wherein the elastic pad is configured to move along the guide while varying a length thereof in an event of bump and rebound,
wherein the vehicle body member is formed in a shape corresponding to the cup portion and directly coupled to the cup portion of the guide,
wherein the guide comprises a circular flange portion extending horizontally from an upper end of the cup portion, and the circular flange portion is in contact with an inner surface of the cup portion and an upper surface of the circular flange portion,
wherein the cup portion has a plurality of air holes formed to penetrate upper and lower surfaces of the cup portion, and
wherein, when the elastic pad is compressed, air present between the guide and the elastic pad is discharged toward the vehicle body member through the plurality of air holes.

* * * * *

UNITED STATES PATENT AND TRADEMARK OFFICE
CERTIFICATE OF CORRECTION

| | | |
|---|---|---|
| PATENT NO. | : 12,285,982 B2 | Page 1 of 1 |
| APPLICATION NO. | : 18/198434 | |
| DATED | : April 29, 2025 | |
| INVENTOR(S) | : Sang Hoon Yoo, Byeong Gu Jang and Mu Geun Choi | |

It is certified that error appears in the above-identified patent and that said Letters Patent is hereby corrected as shown below:

On the Title Page

In the Inventors:
Sang Hoon Yoo, "Anyang-si (KR)" should be replaced with "Asan-si (KR)"

Signed and Sealed this
Tenth Day of June, 2025

Coke Morgan Stewart
*Acting Director of the United States Patent and Trademark Office*